United States Patent
Furi et al.

(10) Patent No.: US 11,125,437 B2
(45) Date of Patent: Sep. 21, 2021

(54) BINARY FUEL STAGING SCHEME FOR IMPROVED TURNDOWN EMISSIONS IN LEAN PREMIXED GAS TURBINE COMBUSTION

(71) Applicant: Siemens Aktiengesellschaft, Munich (DE)

(72) Inventors: Marc Furi, Dorval (CA); Matthew Engelhardt, Vancouver (CA); Fabian Enrique Sanchez, Montreal (CA); Thomas Scarinci, Beaconsfield (CA)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 100 days.

(21) Appl. No.: 16/499,611

(22) PCT Filed: May 16, 2017

(86) PCT No.: PCT/US2017/032797
§ 371 (c)(1),
(2) Date: Sep. 30, 2019

(87) PCT Pub. No.: WO2018/212761
PCT Pub. Date: Nov. 22, 2018

(65) Prior Publication Data
US 2020/0103115 A1 Apr. 2, 2020

(51) Int. Cl.
*F23R 3/34* (2006.01)
*F02C 7/228* (2006.01)
(Continued)

(52) U.S. Cl.
CPC .............. *F23R 3/346* (2013.01); *F02C 7/228* (2013.01); *F02C 7/232* (2013.01); *F02C 9/263* (2013.01); *F02C 9/28* (2013.01); *F23R 3/286* (2013.01)

(58) Field of Classification Search
CPC .. F02C 9/263; F02C 9/28; F02C 7/228; F02C 7/232; F23R 3/286; F23R 3/34; F23R 3/346
See application file for complete search history.

(56) References Cited

U.S. PATENT DOCUMENTS 5,351,477 A   10/1994 Joshi et al.
5,660,045 A * 8/1997 Ito ........................... F23D 23/00
                                                                60/737

(Continued)

FOREIGN PATENT DOCUMENTS

CN    1167234 A    12/1997
CN    105723155 A  6/2016
EP    1531305 A1   5/2005

OTHER PUBLICATIONS

Gianni Ceccherini, Dante Malquori, Giuseppe Petillo and Matteo Falsini, "Retrofitability of DLN/DLE systems", GE Technology Insights 2013, pp. 1-10.

(Continued)

*Primary Examiner* — William H Rodriguez

(57) ABSTRACT

A method for staging premixers in a combustion system for a gas turbine having a compressor section and a turbine section. The method includes providing a plurality of burners each including premixers wherein compressed air from the compressor section is provided to the premixers. The method also includes providing a plurality of fuel circuits that deliver fuel to the premixers to provide premixed air and fuel used for combustion in the combustion system. In addition, the method includes associating premixers with each fuel circuit in accordance with a power of base two pattern. Further, the method includes activating or deactivating the premixers in stages by activating or deactivating an associated fuel circuit to deliver fuel or stop fuel delivery, respectively, to the premixers wherein a staging step size (Continued)

between consecutive stages is in accordance with a power of base two staging scheme.

12 Claims, 16 Drawing Sheets

(51) Int. Cl.
    *F23R 3/28*     (2006.01)
    *F02C 7/232*     (2006.01)
    *F02C 9/26*     (2006.01)
    *F02C 9/28*     (2006.01)

(56) References Cited

U.S. PATENT DOCUMENTS

| | | | |
|---|---|---|---|
| 6,082,111 | A | 7/2000 | Stokes |
| 6,698,206 | B2 | 3/2004 | Scarinci et al. |
| 6,715,295 | B2 | 4/2004 | Gadde et al. |
| 6,732,527 | B2 | 5/2004 | Freeman et al. |
| 6,962,055 | B2 | 11/2005 | Chen et al. |
| 7,841,181 | B2 | 11/2010 | Scarinci et al. |
| 8,881,531 | B2 | 11/2014 | Scarinci et al. |
| 2004/0221582 | A1* | 11/2004 | Howell ............... F23R 3/343 60/778 |
| 2004/0255594 | A1* | 12/2004 | Baino ............... F02C 9/28 60/773 |
| 2006/0101814 | A1* | 5/2006 | Saitoh ............... F23R 3/343 60/377 |
| 2008/0006033 | A1 | 1/2008 | Scarinci et al. |
| 2009/0126367 | A1* | 5/2009 | Chhabra ............... F02C 9/263 60/734 |
| 2012/0180496 | A1 | 7/2012 | Fletcher et al. |
| 2013/0152597 | A1* | 6/2013 | Durbin ............... F23R 3/286 60/773 |
| 2013/0192245 | A1 | 8/2013 | Miura et al. |
| 2014/0130477 | A1* | 5/2014 | Chen ............... F23R 3/34 60/39.463 |
| 2014/0144153 | A1* | 5/2014 | Healy ............... F02C 7/224 60/776 |
| 2014/0238030 | A1 | 8/2014 | Gerendas |
| 2016/0201918 | A1 | 7/2016 | Jella et al. |
| 2019/0242581 | A1* | 8/2019 | Abe ............... F23R 3/20 |

OTHER PUBLICATIONS

PCT International Search Report and Written Opinion of International Searching Authority dated Jan. 15, 2018 corresponding to PCT International Application No. PCT/US2017/032797 filed May 16, 2017.

* cited by examiner

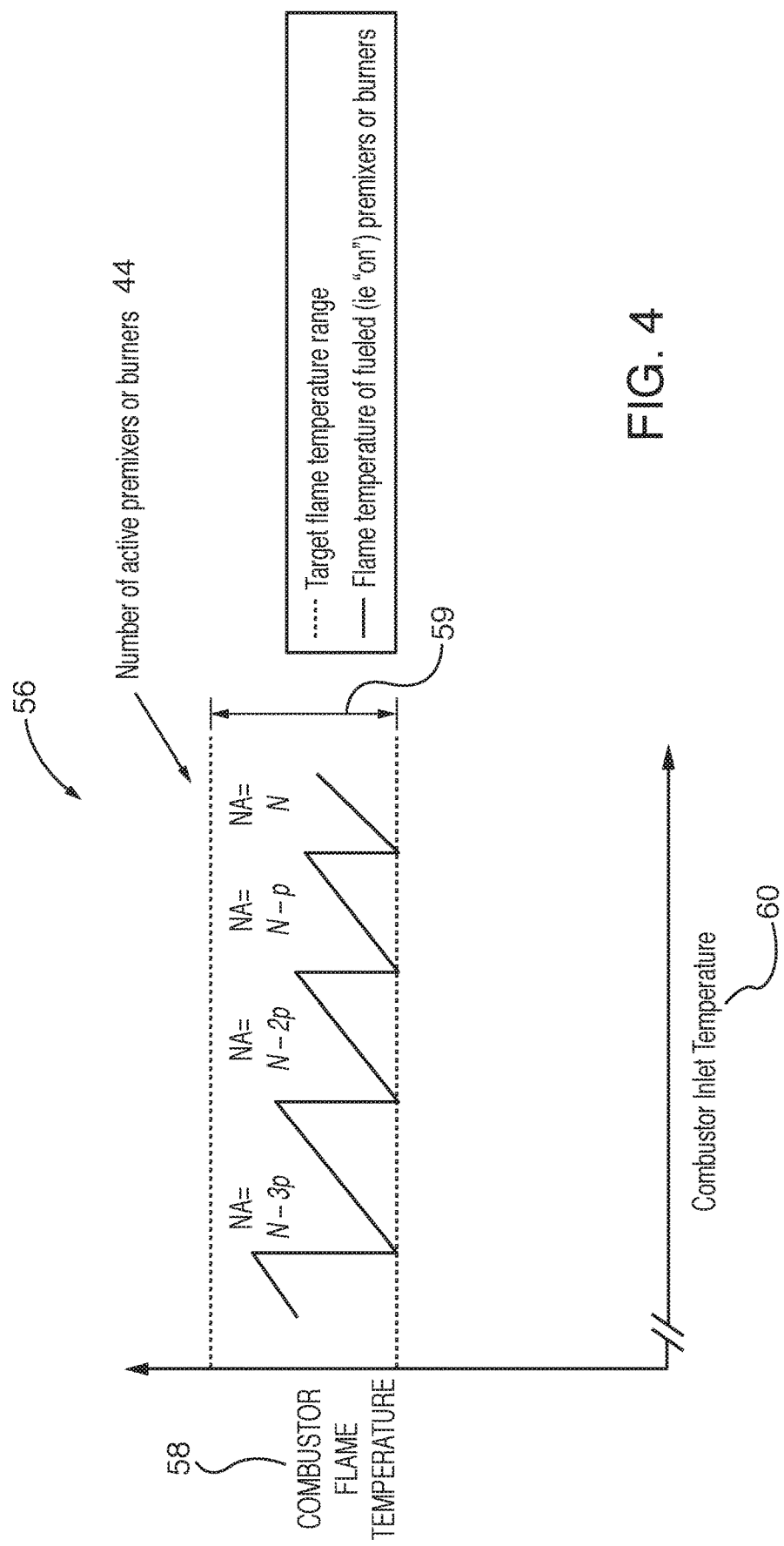

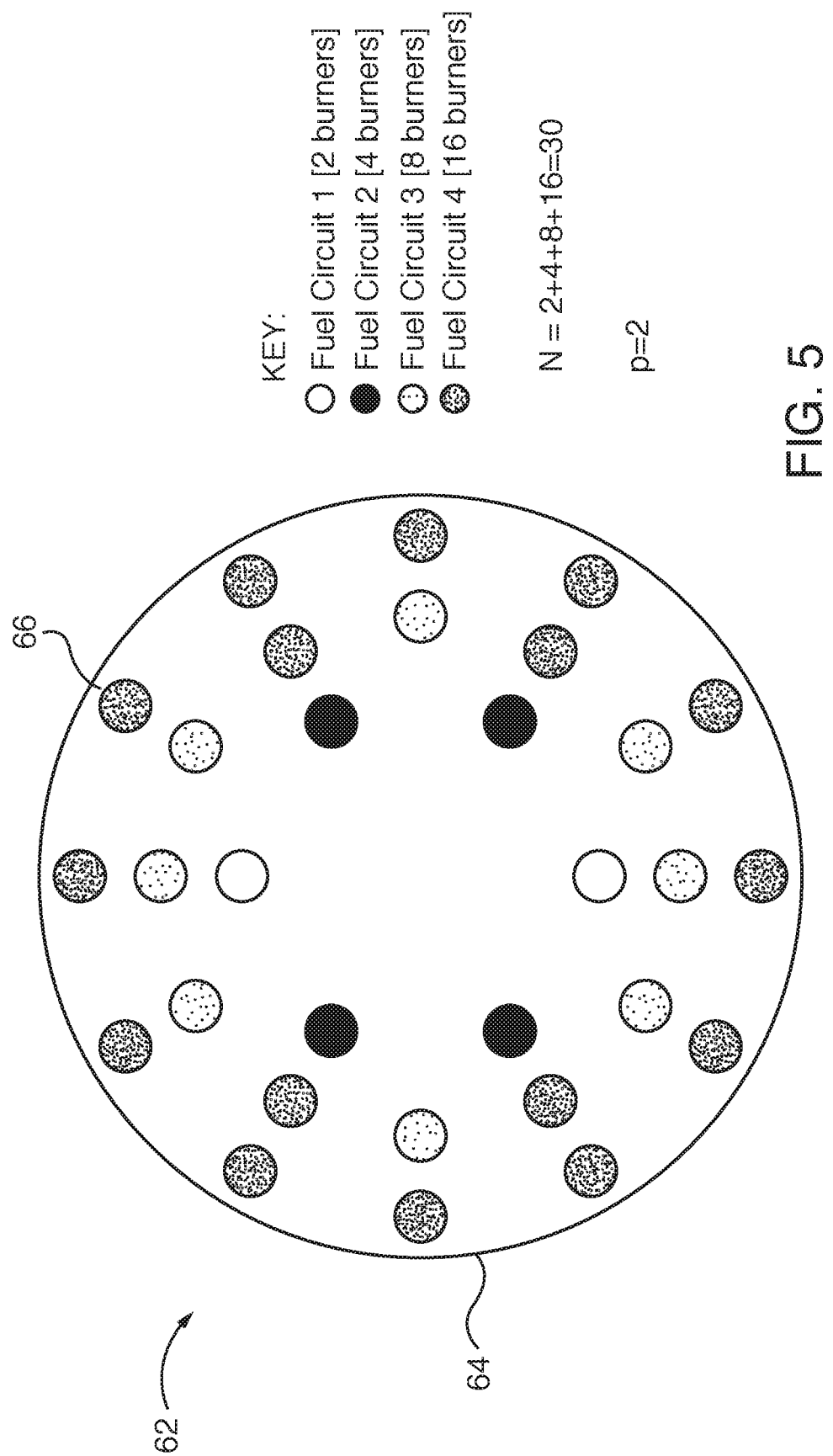

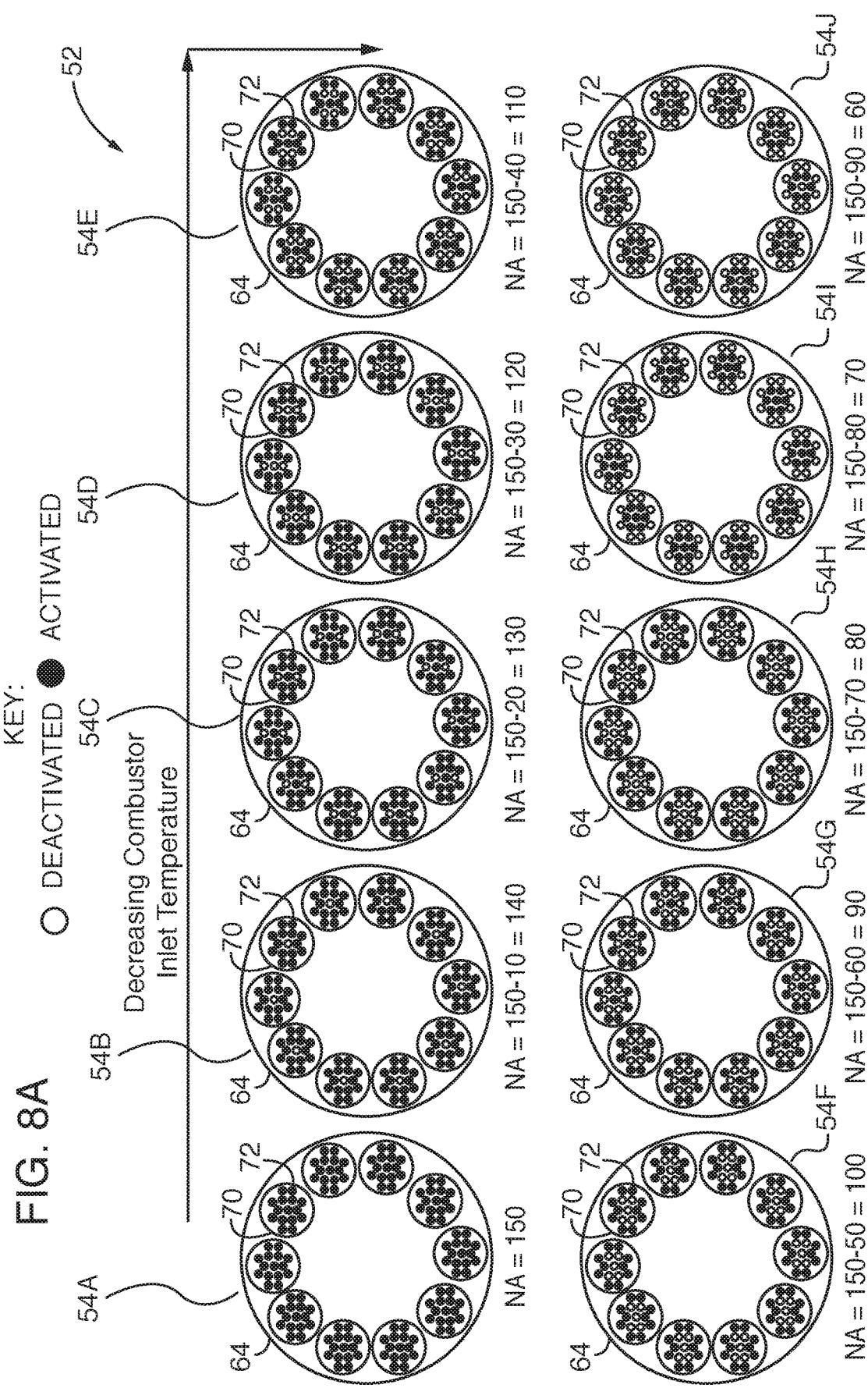

FIG. 10A

KEY:

⊘ Fuel Circuit 1 (1 Premixer)

⦷ Fuel Circuit 2 (2 Premixers)

⊖ Fuel Circuit 3 (4 Premixers)

⊘ Fuel Circuit 4 (8 Premixers)

BINARY FUEL STAGING SCHEME FOR IMPROVED TURNDOWN EMISSIONS IN LEAN PREMIXED GAS TURBINE COMBUSTION

The entire disclosure of the following patents and patent applications are hereby incorporated by reference in their entirety: U.S. Pat. No. 6,698,206, issued on Mar. 2, 2004, and entitled "Combustion Chamber"; U.S. Pat. No. 6,732,527, issued on May 11, 2004, and entitled "Combustion Chamber"; U.S. Pat. No. 7,841,181, issued on Nov. 30, 2010, and entitled "Gas Turbine Engine Combustion Systems"; U.S. Pat. No. 8,881,531, issued on Nov. 11, 2014, and entitled "Gas Turbine Engine Premix Injectors"; International Application No. PCT/US17/16420, filed on Feb. 3, 2017, and entitled "Combustor with Three-Dimensional Lattice Premixer"; International Application No. PCT/US17/16391, filed on Feb. 3, 2017, and entitled "Method for Normalizing Fuel-Air Mixture Within a Combustor."

TECHNICAL FIELD

The invention relates to a method for staging premixers in a combustion system, and more particularly, to a method wherein fuel circuits are activated or deactivated in stages to deliver fuel or stop fuel delivery, respectively, to the premixers wherein a staging step size between consecutive stages is in accordance with a power of base two staging scheme.

BACKGROUND

In various multistage turbomachines used for energy conversion, such as gas turbines, a fluid is used to produce rotational motion. Referring to FIG. 1, a gas turbine 10 is schematically shown. The turbine 10 includes a compressor section 12, which draws in ambient air 14 and delivers compressed air 16 to a combustion section 18. A fuel supply 20 delivers fuel 22 to the combustion section 18 where it is combined with the compressed air 16 and the fuel 22 is burned to produce high temperature combustion gas 24. The combustion gas 24 is expanded through a turbine section 26, which includes a series of rows of stationary vanes and rotor blades. The combustion gas 24 causes the rotor blades to rotate to produce shaft horsepower for driving the compressor 12 and a load, such as an electrical generator 28. Expanded gas 30 is either exhausted to the atmosphere directly, or in a combined cycle plant, may be exhausted to atmosphere through a heat recovery steam generator.

Exhaust gas produced by the gas turbine may include certain emissions, such as nitrogen oxides (NOx), carbon monoxide (CO), and unburned hydrocarbons (UHCs). It is desirable to eliminate or substantially reduce the amount of such emissions in the exhaust gas prior to releasing the exhaust gas into the atmosphere. A method for reducing emissions includes the use of a Dry Low Emissions (DLE) combustion system in the gas turbine. In such systems, a known premixed combustion process is used wherein compressed air 16 and fuel 22 are premixed in premixer elements (premixers) prior to combustion to provide an appropriate mixture of air and fuel that reduces emissions by controlling combustor flame temperature. Many gas turbines that utilize a DLE combustion system use a compressed air bleed system to ensure compliant emissions when the gas turbine is operating at partial power or during cold ambient conditions. However, such bleed systems result in an undesirable thermal efficiency penalty for the gas turbine since high enthalpy air from the compressor is rejected.

SUMMARY OF THE INVENTION

A method is disclosed for staging fuel circuits in a combustion system for a gas turbine having a compressor section and a turbine section. The method includes providing a plurality of burners each including premixers wherein compressed air from the compressor section is provided to the premixers. The method also includes providing a plurality of fuel circuits that deliver fuel to the premixers to provide premixed air and fuel used for combustion in the combustion system. In addition, the method includes associating premixers with each fuel circuit in accordance with a power of base two pattern. Further, the method includes activating or deactivating the premixers in stages by activating or deactivating an associated fuel circuit to deliver fuel or stop fuel delivery, respectively, to the premixers wherein a staging step size between consecutive stages is in accordance with a power of base two staging scheme.

Those skilled in the art may apply the respective features of the present invention jointly or severally in any combination or sub-combination.

BRIEF DESCRIPTION OF DRAWINGS

The exemplary embodiments of the invention are further described in the following detailed description in conjunction with the accompanying drawings, in which:

FIG. 4 is a graph depicting an exemplary burner flame temperature for a gas turbine relative to combustor inlet temperature.

FIG. 5 is a schematic cross sectional view of an exemplary combustion section of a gas turbine.

FIGS. 8A and 8B depict a binary staging scheme for staging the premixers described in relation to FIG. 7.

FIGS. 10A and 10B depict a binary staging scheme for staging the premixers described in relation to FIG. 9.

To facilitate understanding, identical reference numerals have been used, where possible, to designate identical elements that are common to the figures. The figures are not drawn to scale.

DESCRIPTION OF EMBODIMENTS

Figure 1:
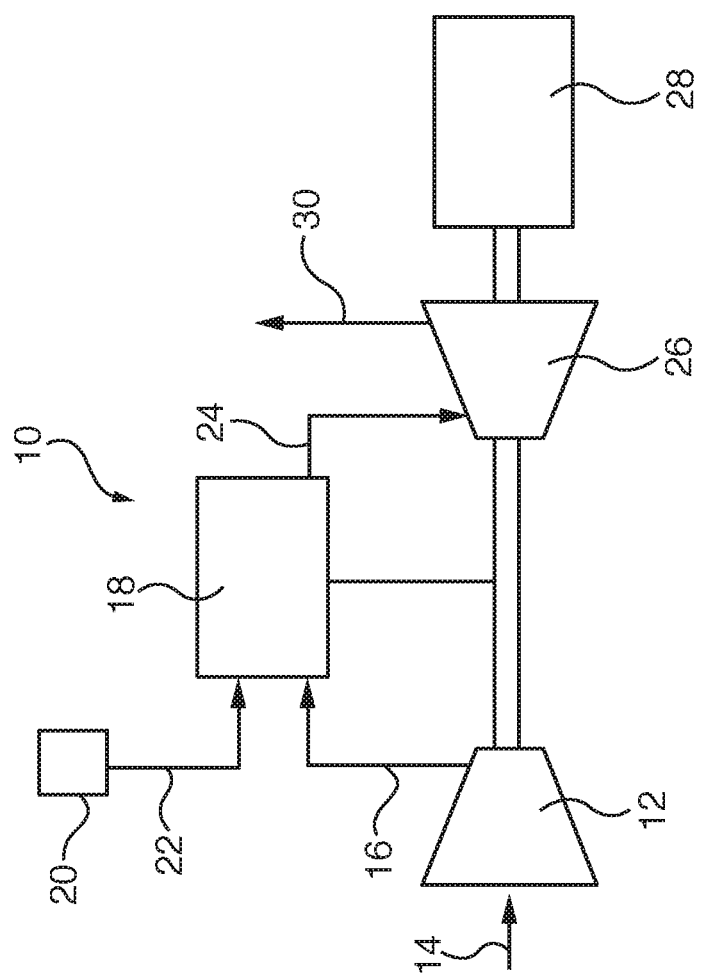
FIG. 1 depicts a schematic of a gas turbine.

Although various embodiments that incorporate the teachings of the present disclosure have been shown and described in detail herein, those skilled in the art can readily devise many other varied embodiments that still incorporate these teachings. The scope of the disclosure is not limited in its application to the exemplary embodiment details of construction and the arrangement of components set forth in the description or illustrated in the drawings. The disclosure encompasses other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Figure 2:
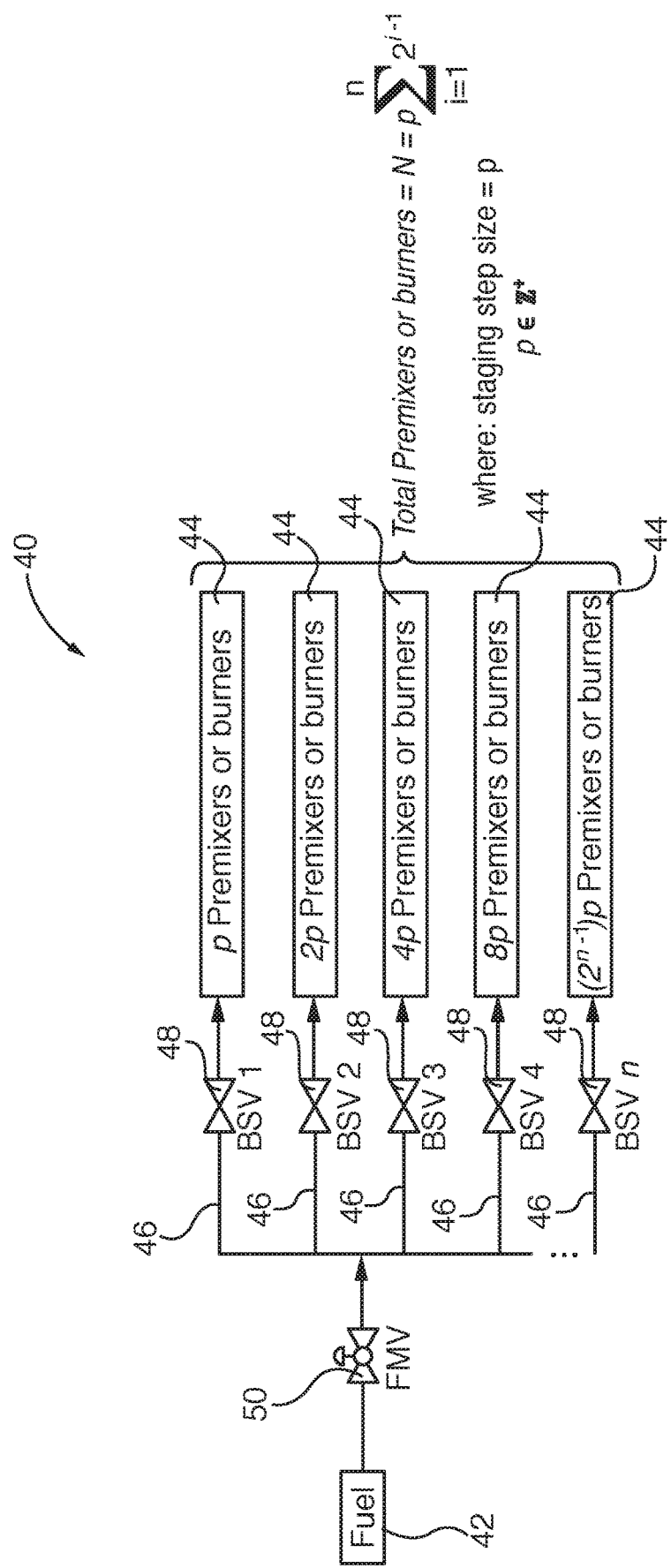
FIG. 2 shows a fuel circuit/Block Scheduling Valve (BSV) arrangement for a binary staging configuration for staging premixers in a gas turbine.

In an aspect of the invention, a binary staging scheme is utilized in order to stage, or sequence, the activation or deactivation of selected premixers or burners in order to maintain combustor flame temperature within a desired range suitable for reducing gas turbine emissions. FIG. 2 shows a fuel circuit/Block Scheduling Valve (BSV) arrangement 40 for a binary staging configuration for staging premixers in a gas turbine. Fuel from a fuel supply 42 is delivered to a group or subset of associated premixers or burners (i.e. combustors) 44 via associated fuel circuits 46. Each fuel circuit 46 includes a single fuel valve 48 such as a known Block Scheduling Valve (BSV) 48 that controls fuel delivery to the associated premixers or burners 44. In particular, each BSV 48 either opens to deliver fuel to associated premixers or burners 44 (i.e. activate the fuel circuit 46 and the premixers or burners 44) or closes to stop fuel delivery to the associated premixers or burners 44 (i.e. deactivate the fuel circuit and the premixers or burners 44). Fuel delivery from the fuel supply 42 to the fuel control valves 48 is controlled by a known fuel metering valve (FMV) 50. The BSVs 48 and fuel metering valve 50 are controlled by a controller. In accordance with an embodiment of the invention, a power of base two pattern is used to determine the number of premixers or burners 44 associated with each fuel circuit 46 or BSV 48. The number of premixers 44 associated with a BSV 48 (and associated fuel circuit 46) is given by:

$$\text{No. of premixers or burners 44 associated with a BSV} n = (2^{n-1})p \quad \text{Eqn. (1)}$$

where n=BSV or fuel circuit number, p=staging step size and $p \in \mathbb{Z}^+$. Staging step size p sets a resolution for a staging scheme (i.e. the change in the number of active premixers or burners 44 between consecutive staging steps).

For example, if n=4, then BSV1, BSV2, BSV3 and BSV4 are associated with p, 2p, 4p and 8p premixers or burners 44, respectively, as shown in FIG. 2. If p=2 for example, then BSV1, BSV2, BSV3 and BSV4 are associated with 2, 4, 8 and 16 premixers or burners 44, respectively. Thus, BSV2, BSV3 and BSV4 are each able to turn activate or deactivate more than one premixer or burner 44.

The total number of premixers or burners 44 for a given number of BSVs 48 is given by:

$$\text{Total no. of premixers or burners 44} = N = p\Sigma_{i=1}^{n}2^{i-1}. \quad \text{Eqn. (2)}$$

Further, the total number of possible staging steps is given by:

$$\text{Total no. of possible staging steps} = S = (\Sigma_{i=1}^{n}2^{i-1}) - 1 = N/p - 1. \quad \text{Eqn. (3)}$$

If n=4, the total number of premixers or burners 44=1p+2p+4p+8p=15p. If p=2, the total number premixers or burners 44=30, with a total number of possible staging steps S=30/2−1=14. Thus, only 4 BSVs 48 are required to perform 14 steps or valve manoeuvres (i.e. the act of turning on or off valves) with 30 premixers or burners 44. For example, staging steps 15p, 14p, 13p, 12p, 11p, 10p, 9p, 8p, 7p, 6p, 5p, 4p, 3p, 2p, 1p) result in 14 valve manoeuvres. In an aspect, the invention minimizes the number of BSVs 48 that are required for a given number of staging steps, thus reducing system cost and complexity. For example, without the binary staging scheme, up to 14 valves, such as 14 BSVs 48, would be necessary to achieve the same number of staging steps of resolution p.

Figure 3:
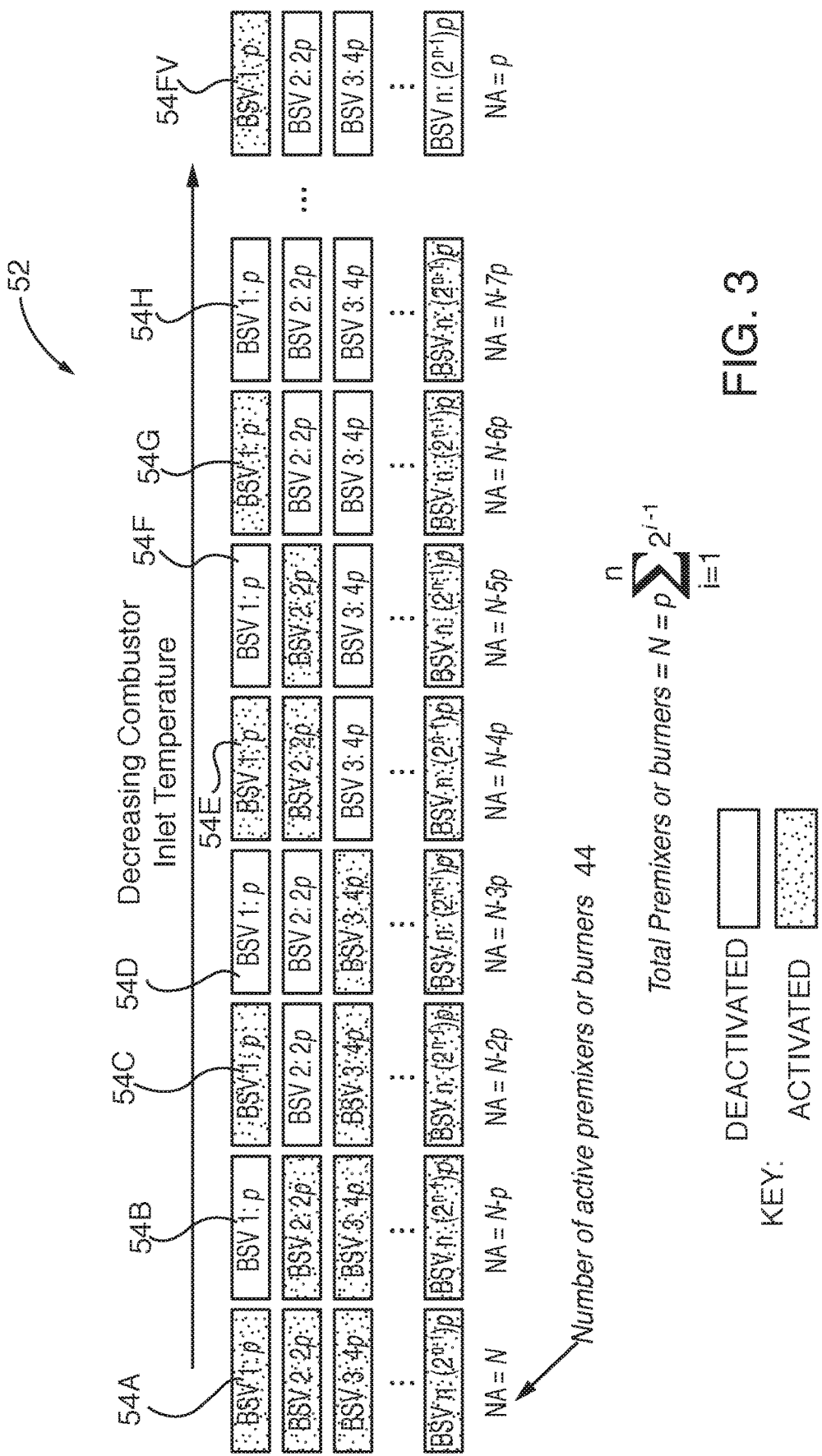
FIG. 3 depicts an implementation of a binary staging scheme for premixers or burners.

FIG. 3 depicts an implementation of a binary staging scheme 52 for premixers or burners 44 wherein selected premixers or burners 44 (see FIG. 2) are activated or deactivated during a sequence of staging steps 54A-54FV. It is noted that combustor inlet temperature is a function of turbine power and ambient temperature. In accordance with an aspect of the invention, fuel circuits 46 are re-combined (i.e. activated or deactivated) such that a staging step size p between consecutive steps 54A-54FV is minimized as combustor inlet temperature changes in order to minimize any substantial jumps/increases in combustor flame temperature. Since the fuel circuits 46 are grouped in powers of base two, the fuel circuits 46 are re-combined such that the staging step size is always equal to p. At maximum combustor inlet temperature (step 54A), the number of active premixers or burners 44 ("NA" in FIG. 3) is equal to the total number of premixers or burners 44 ("N" in FIG. 3). As combustor inlet temperature decreases, premixers or burners 44 are deactivated in accordance with the binary staging scheme 52, thus decreasing the number of active premixers or burners 44. In particular, the number of active premixers or burners 44 decreases by the staging step size p (step 54B) and subsequently by increasing consecutive multiples of p (N−p, N−2p, N−3p, N−4p, N−5p, N−6p, N−7p etc. at steps 54C, 54D, 54E, 54F, 54G, 54H, respectively) wherein additional premixers or burners 44 are deactivated. This pattern continues until the number of active premixers or burners 44 is equivalent to the staging step size p (step 54FV—"first/final value").

FIG. 4 is a graph 56 depicting an exemplary burner or combustor flame temperature 58 for a gas turbine relative to combustor inlet temperature 60. As combustor inlet temperature 60 increases, premixers or burners 44 are activated in accordance with the binary staging scheme 52, thus increasing the number of active premixers or burners 44. For example, the number of active premixers or burners 44 increases by decreasing multiples of p (N−3p, N−2p, N−p at steps 54D, 54C, 54B, respectively) as combustor inlet temperature 60 increases. This pattern continues until the number of active premixers or burners 44 is equivalent to the total number of premixers or burners 44. Referring to FIG. 4, the combustor flame temperature 58 for the gas turbine remains within a target flame temperature range 59 during each staging step thereby minimizing pollutant emissions at all combustor inlet temperatures.

Referring to FIG. 5, a schematic cross sectional view of an exemplary combustion section 62 of a gas turbine 64 is shown. The combustion section 62 includes burners 66 that are arranged in a can or annular architecture, for example. Each burner 66 includes at least one premixer. In this example, the gas turbine 64 includes 4 fuel circuits (Fuel Circuit 1, Fuel Circuit 2, Fuel Circuit 3, Fuel Circuit 4) and p is selected as 2. Fuel Circuit 1 is associated with 2 burners (p), Fuel Circuit 2 is associated with 4 burners (2p), Fuel Circuit 3 is associated with 8 burners (4p) and Fuel Circuit 4 is associated with 16 burners (8p). Further, the total number of burners is 30 in accordance with Eqn. 2. Fuel Circuits 1-4 each deliver fuel to all of the premixers associated with a burner 66. In addition, Fuel Circuits 1-4 each include a single BSV 48 for controlling fuel delivery to all of the premixers associated with a burner 66. Thus, opening or closing a BSV 48 activates or deactivates all of the premixers associated with a burner 66 and turns the burner 66 on or off, respectively.

Figure 6A:
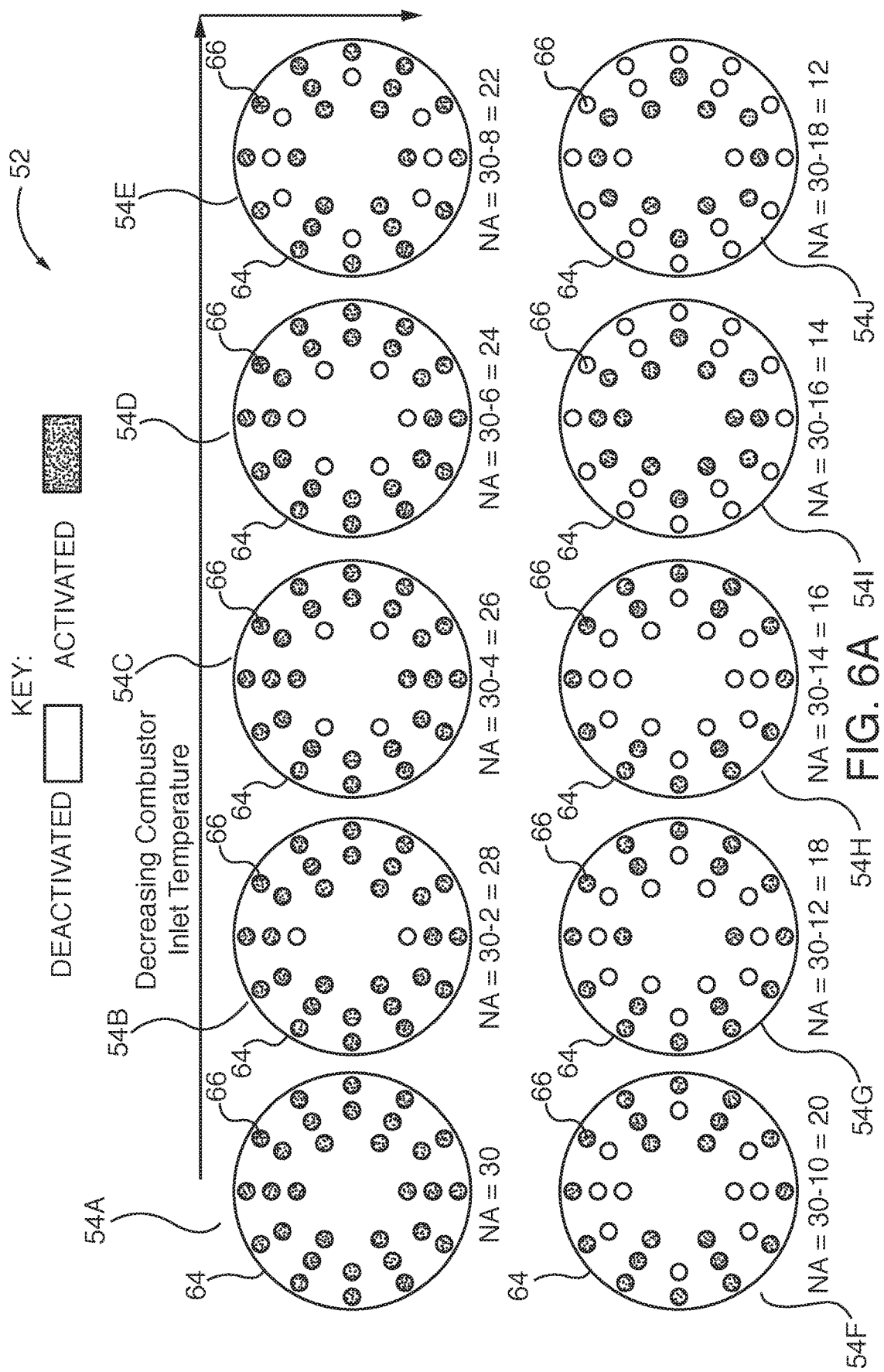
FIGS. 6A and 6B depict a binary staging scheme for staging the burners described in relation to FIG. 5.
Figure 6B:
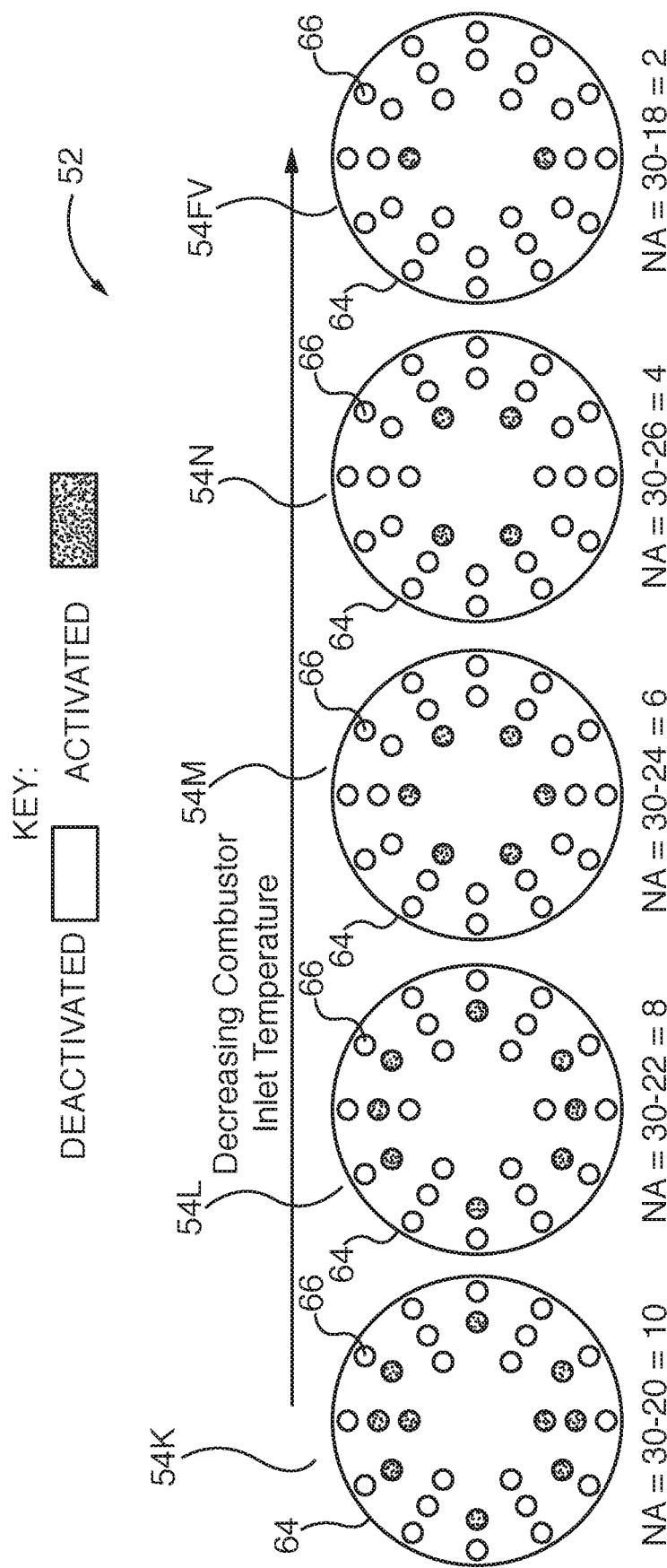

Referring to FIGS. 6A and 6B, a binary staging scheme 52 for staging the burners 66 described in relation to FIG. 5 is shown. At maximum combustor inlet temperature (step 54A), each of the BSVs 48 associated with Fuel Circuits 1-4 is open thus activating each burner 66 (i.e. NA=N=30). As combustor inlet temperature decreases, the burners 66 are deactivated in accordance with the binary staging scheme 52, thus decreasing the number of active burners 66. In particular, the number of active burners 66 decreases by the staging step size p (step 54B) and subsequently by increasing consecutive multiples of p (N–p, N–2p, N–3p, N–4p, N–5p, N–6p, N–7p, N–8p, N–9p, N–10p, N–11p, N–12p, N–13p) at steps 54B, 54C, 54D, 54E, 54F, 54G, 54H, 54I, 54J, 54K, 54L, 54M, 54N, respectively) wherein additional burners 66 are deactivated as previously described in relation to FIG. 3. Thus, 2 burners are deactivated at step 54B and the number of active burners 66 is 30–2=28 (i.e. NA=N–p). At step 54C, 4 burners 66 are deactivated and the number of active burners 66 is 30–4=26 (i.e. NA=N–2p). At step 54D, 6 burners 66 are deactivated and the number of active burners 66 is 30–6=24 (i.e. NA=N–3p). At step 54E, 8 burners 66 are deactivated and the number of active burners 66 is 30–8=22 (i.e. NA=N–4p). Additional burners 66 are deactivated in accordance with the binary staging scheme 52 described in relation to FIG. 3 such that the number of active burners is 20, 18, 16, 14, 12, 10, 8, 6, 4 at steps 54F, 54G, 54H, 54I, 54J, 54K, 54L, 54M, 54N, respectively, until the number of active burners 66 is equivalent to the staging step size 2 (i.e. p; step 54FV).

Figure 7:
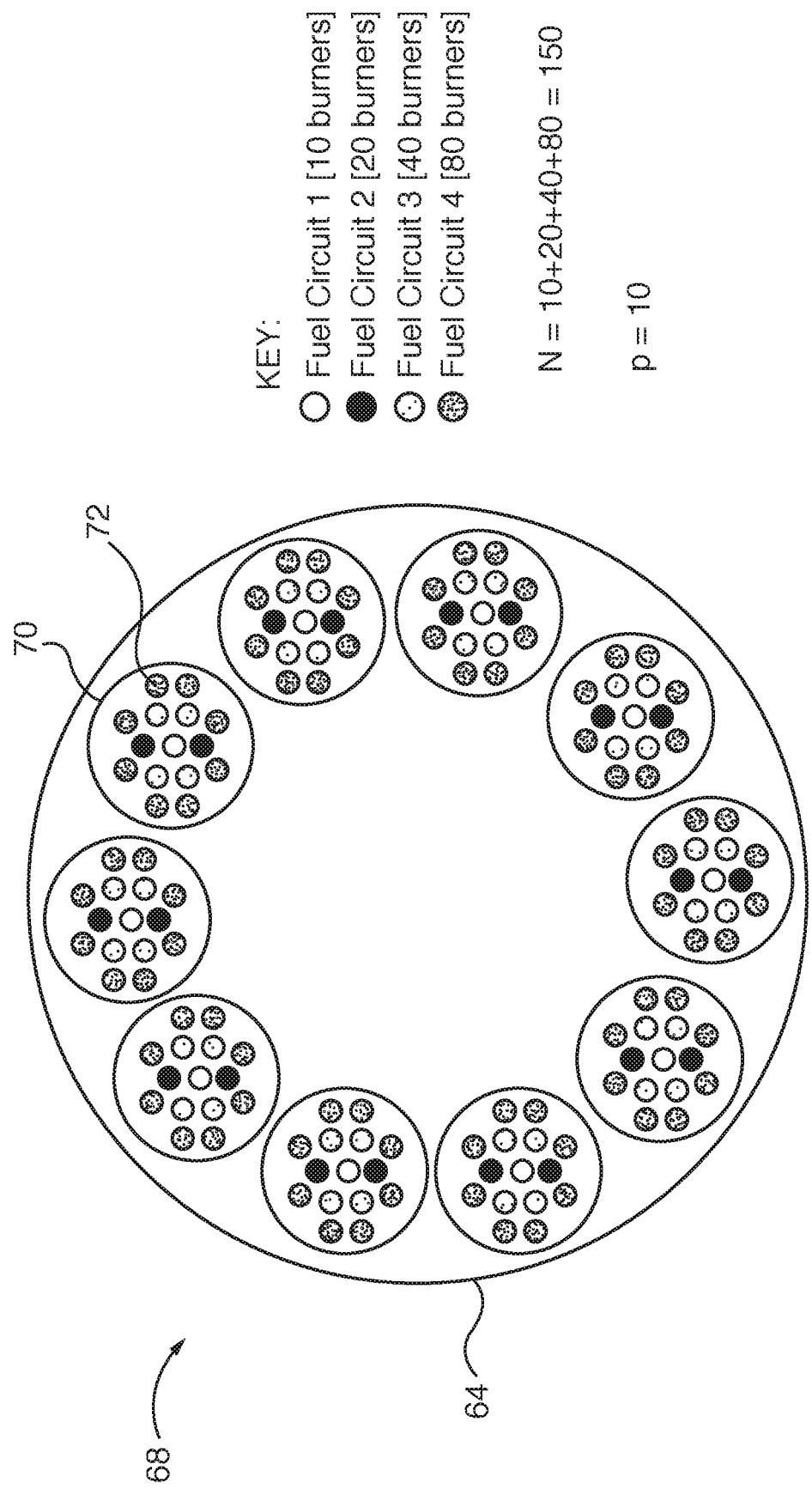
FIG. 7 is schematic cross sectional view of an alternate embodiment of a combustion section of the gas turbine.

Referring to FIG. 7, a schematic cross sectional view of an alternate embodiment of a combustion section 68 of the gas turbine 64 is shown. The combustion section 68 includes a plurality of burners 70 wherein each burner 70 includes at least one premixer 72. In this embodiment, the premixers 72 within each burner 70 are staged in accordance with the binary staging scheme 52. The gas turbine 64 includes four fuel circuits (Fuel Circuits 1-4) and p is selected as 10. Fuel Circuit 1 is associated with 10 premixers (p), Fuel Circuit 2 is associated with 20 premixers (2p), Fuel Circuit 3 is associated with 40 premixers (4p) and Fuel Circuit 4 is associated with 80 premixers (8p). The total number of premixers is 150 in accordance with Eqn. 2. Each burner 70 includes premixers 72 that are associated with each of the fuel circuits (Fuel Circuits 1-4). In particular, each burner 70 includes 1 premixer 72 associated with Fuel Circuit 1, 2 premixers 72 associated with Fuel Circuit 2, 4 premixers 72 associated with Fuel Circuit 3 and 8 premixers 72 associated with Fuel Circuit 4. Fuel Circuits 1-4 each include a single BSV 48 for controlling fuel delivery to associated premixers 72. Thus, opening or closing a BSV 48 activates or deactivates associated premixers 72 in each of the burners 70 to provide staging of premixers 72 within each burner 70.

Figure 8B:
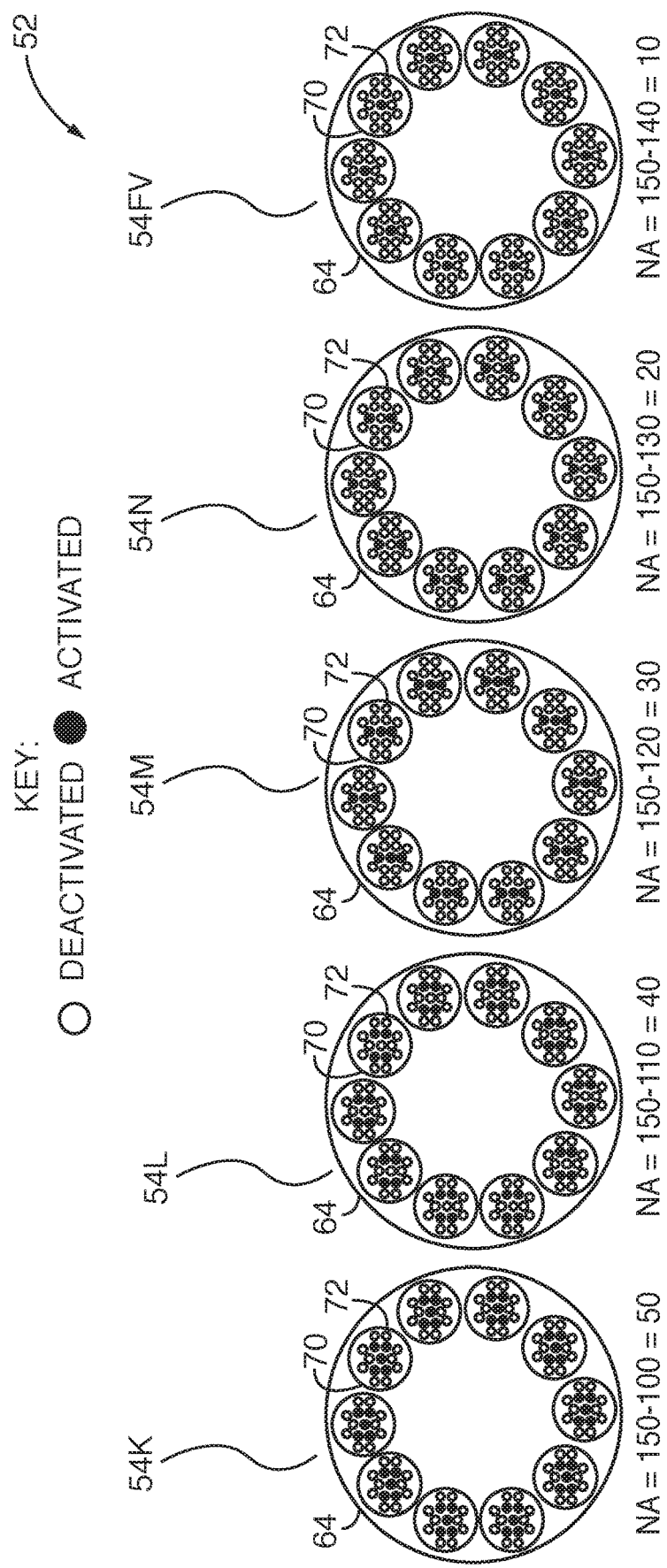

Referring to FIGS. 8A and 8B, a binary staging scheme 52 for staging the premixers 72 described in relation to FIG. 7 is shown. At maximum combustor inlet temperature (step 54A), each of the BSVs 48 associated with Fuel Circuits 1-4 is open thus activating each premixer 72 (i.e. NA=N=150). As combustor inlet temperature decreases, the premixers 72 are deactivated in accordance with the binary staging scheme 52, thus decreasing the number of active premixers 72. In particular, the number of active premixers 72 decreases by the staging step size p (step 54B) and subsequently by increasing consecutive multiples of p (N–p, N–2p, N–3p, N–4p, N–5p, N–6p, N–7p, N–8p, N–9p, N–10p, N–11p, N–12p, N–13p at steps 54B, 54C, 54D, 54E, 54F, 54G, 54H, 54I, 54J, 54K, 54L, 54M, 54N, respectively) wherein additional premixers 72 are deactivated as previously described in relation to FIG. 3. Thus, 10 premixers are deactivated at step 54B and the number of active premixers is 150–10=140 (i.e. NA=N–p). At step 54C, 20 premixers 72 are deactivated and the number of active premixers 72 is 150–20=130 (i.e. NA=N–2p). At step 54D, 30 premixers 72 are deactivated and the number of active premixers 72 is 150–30=120 (i.e. NA=N–3p). At step 54E, 40 premixers 72 are deactivated and the number of active premixers 72 is 150–40=110 (i.e. NA=N–4p). Additional premixers 72 are deactivated in accordance with the binary staging scheme 52 described in relation to FIG. 3 such that the number of active premixers is 100, 90, 80, 70, 60, 50, 40, 30, 20 at steps 54F, 54G, 54H, 54I, 54J, 54K, 54L, 54M, 54N, respectively, until the number of active premixers 72 is equivalent to the staging step size 10 (i.e. p; step 54FV).

Figure 9:
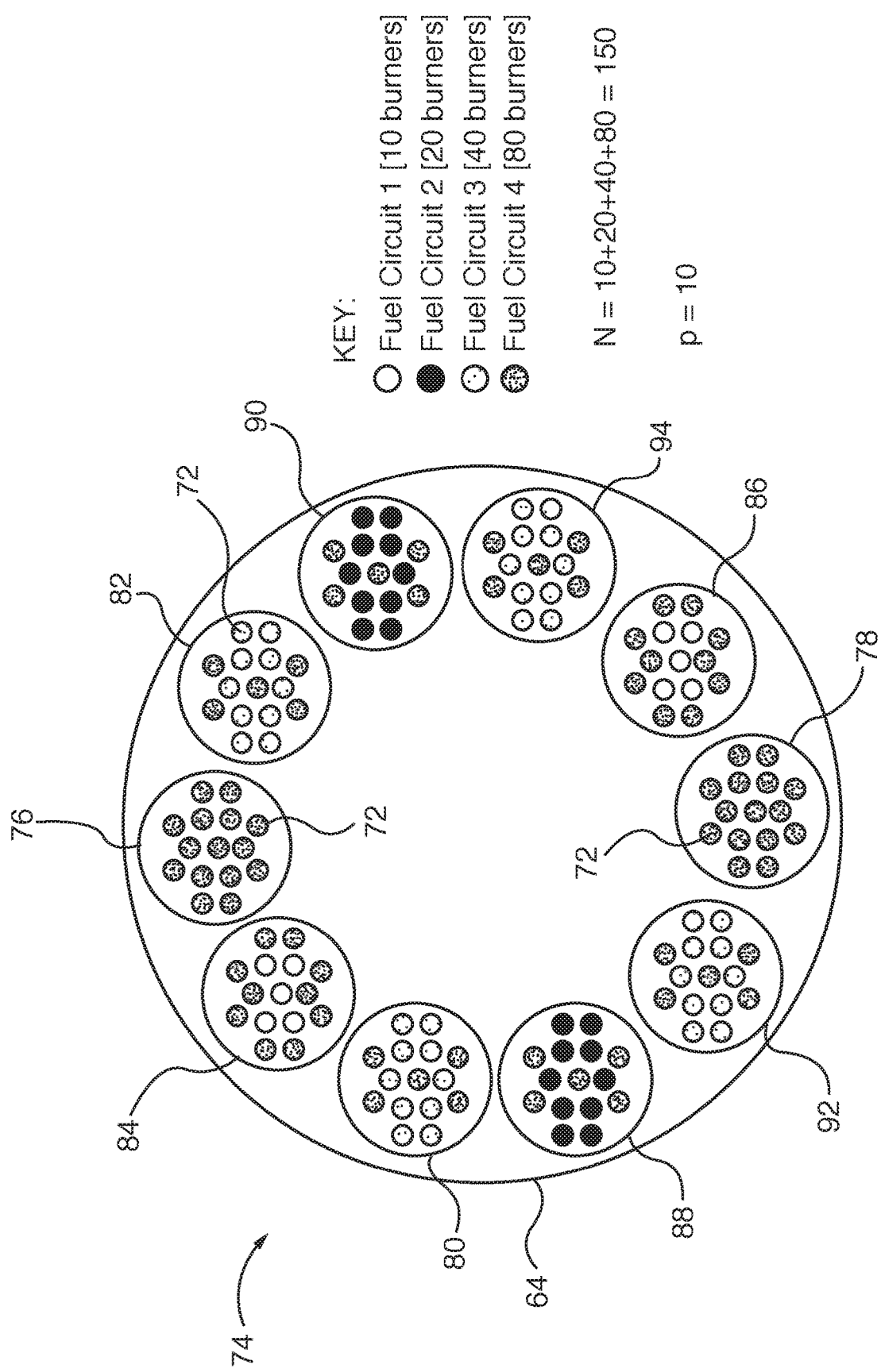
FIG. 9 is a schematic cross sectional view of a further embodiment of a combustion section of the gas turbine.

Referring to FIG. 9, a schematic cross sectional view of a further embodiment of a combustion section 74 of the gas turbine 64 is shown. In FIG. 9, Fuel Circuits 1-4 are distributed asymmetrically between the burners. The gas turbine 64 includes four fuel circuits (Fuel Circuits 1-4), p is selected as 10 and each of the Fuel Circuits 1-4 include a single BSV 48 for controlling fuel delivery to associated premixers 72 as previously described. In this embodiment, first 76 and second 78 burners include premixers 72 associated with a single fuel circuit, i.e. Fuel Circuit 4 for example. Additional pairs of burners include premixers 72 associated with more than one fuel circuit. For example, third 80 and fourth 82 burners include premixers 72 associated with Fuel Circuits 3 and 4, fifth 84 and sixth 86 burners include premixers 72 associated with Fuel Circuits 1 and 4, seventh 88 and eighth 90 burners include premixers 72 associated with Fuel Circuits 2 and 4 and ninth 92 and tenth 94 burners include premixers 72 associated with Fuel Circuits 3 and 4.

Figure 10A:
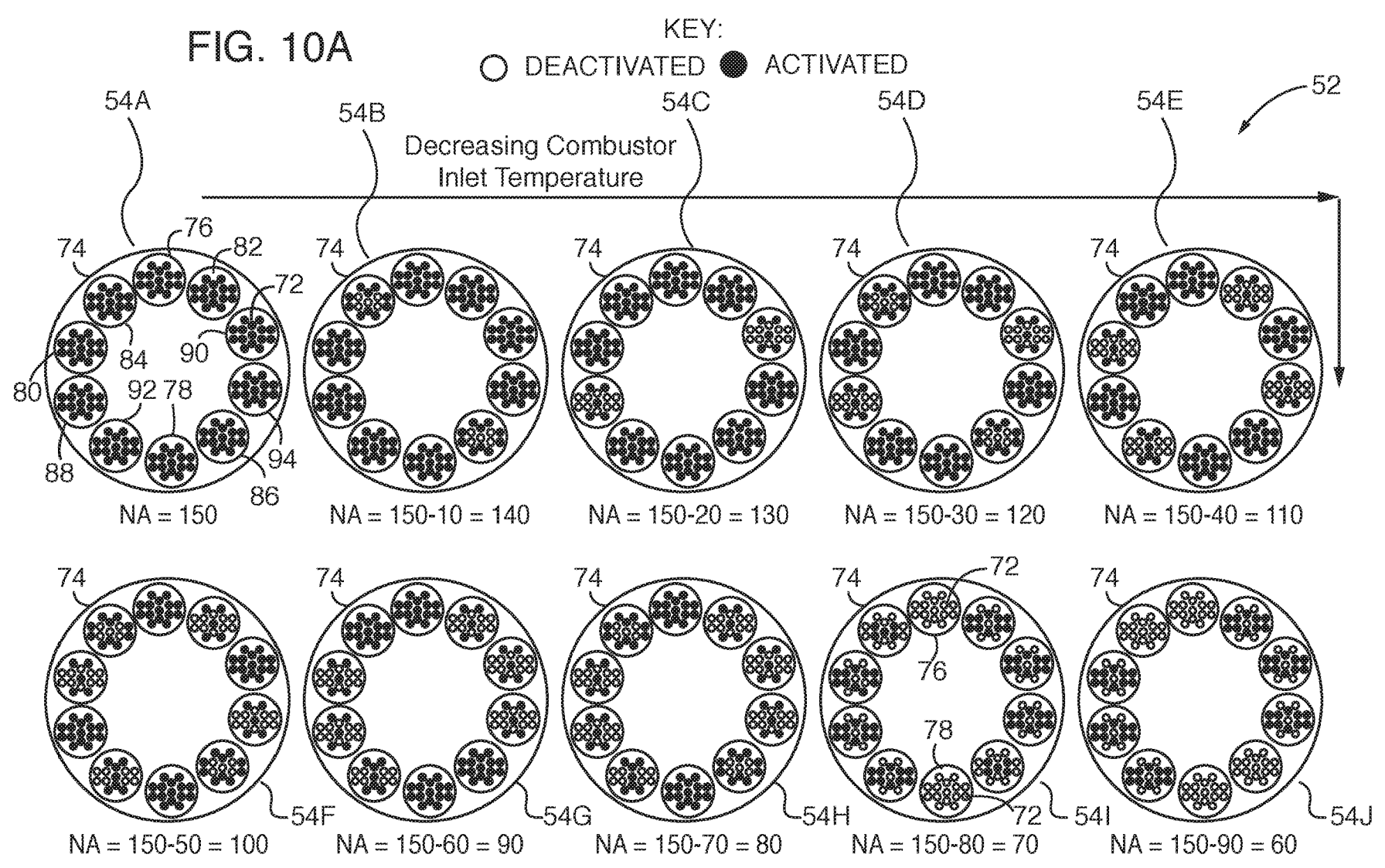
Figure 10B:
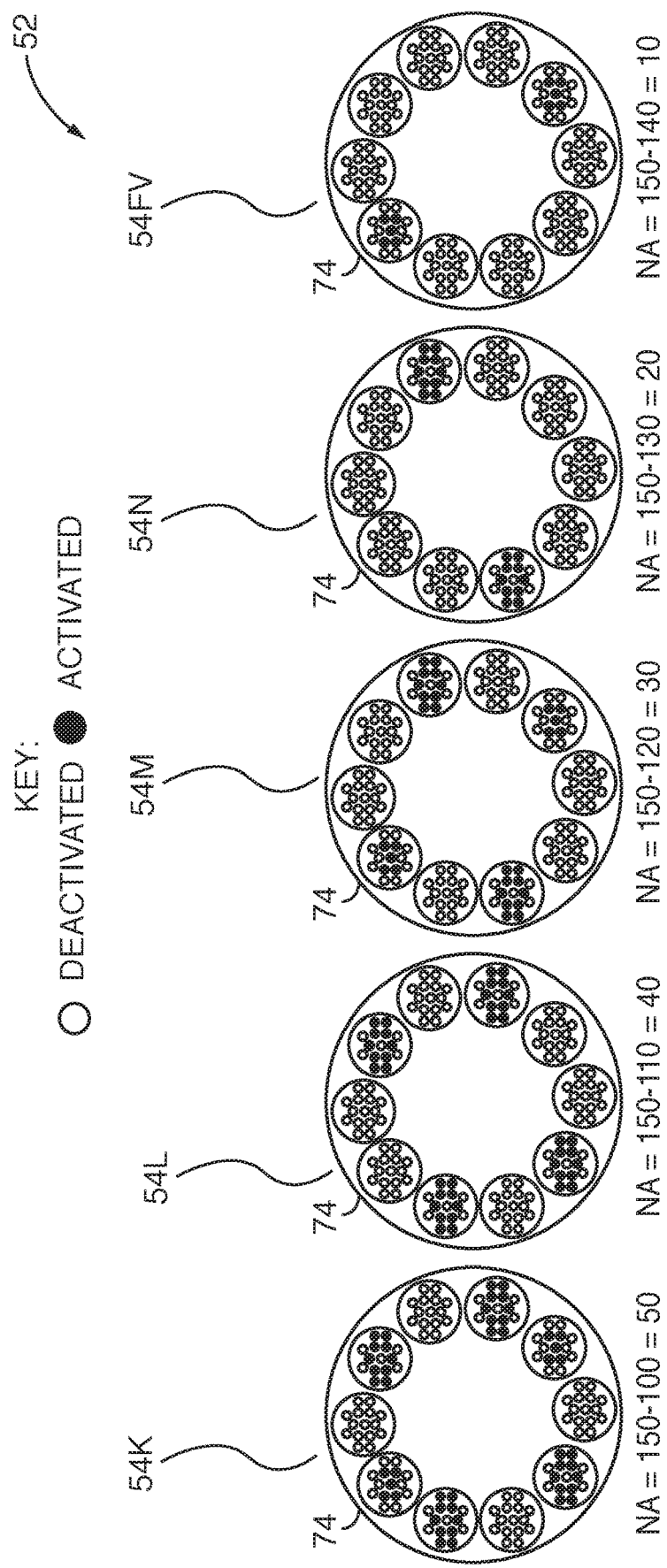

Referring to FIGS. 10A and 10B, a binary staging scheme 52 for staging the premixers 72 described in relation to FIG. 9 is shown. The number of active premixers associated with staging steps 54A-54FV for the configuration shown in FIG. 9 is identical to that described in relation to FIGS. 8A and 8B (i.e. 150, 140, 130, 120, 110, 100, 90, 80, 70, 60, 50, 40, 30, 20, 10, respectively). In this embodiment, different sets of premixers are activated or deactivated than those shown in FIGS. 8A and 8B due to the asymmetrical distribution of the Fuel Circuits 1-4 relative to the burners. For example, opening or closing the BSV 48 associated with Fuel Circuit 4 activates or deactivates all of the premixers 72 associated with the first 76 and second 78 burners and turns the first 76 and second 78 burners on or off, respectively, at step 54I. Referring to step 54I of FIG. 8A, it can be seen that selected premixers 72 are still activated and that the associated burners 70 are still on.

Figure 11:
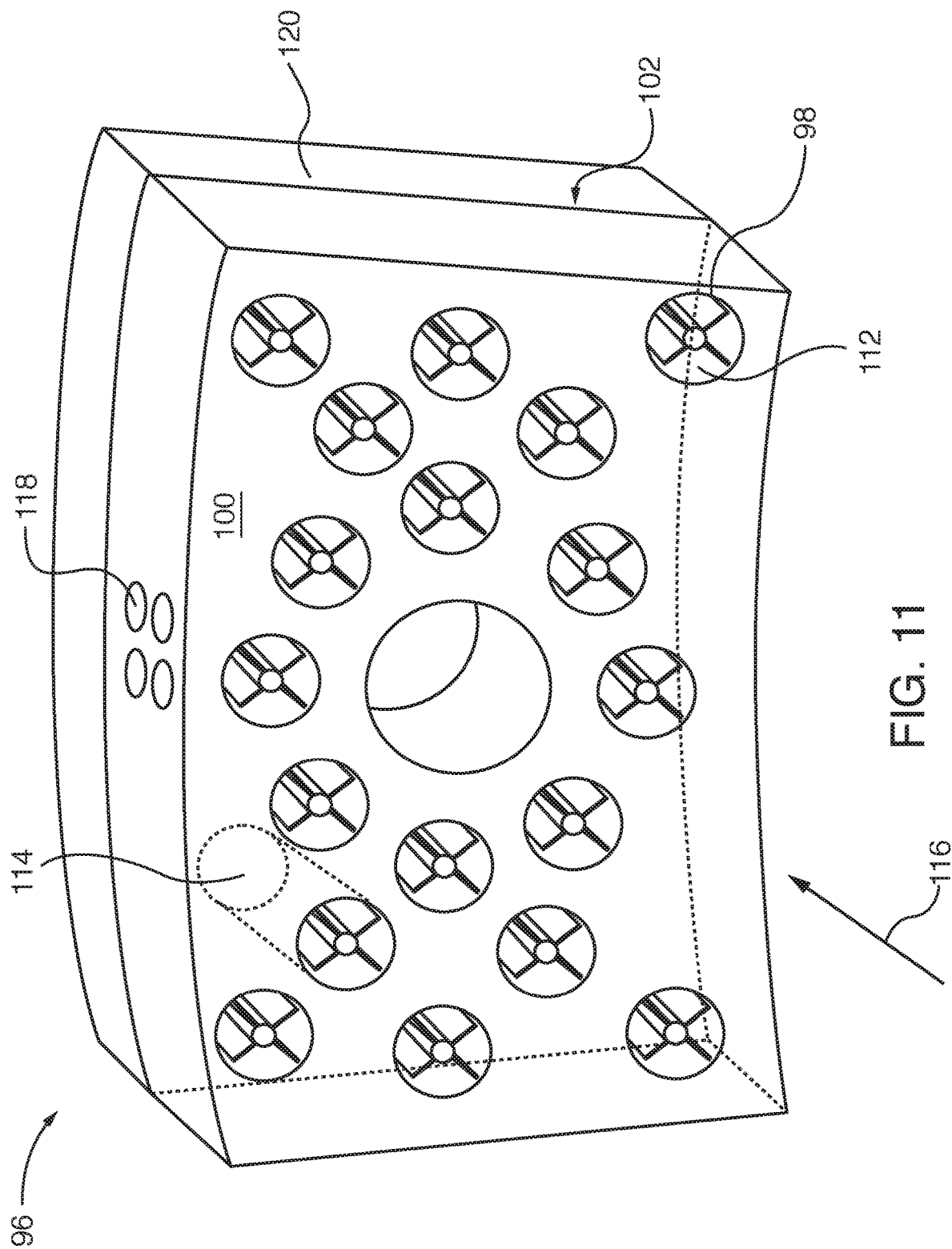
FIG. 11 is view of an exemplary single integrated tile for use in the combustion system.

In an embodiment, a combustion section may include a plurality of tiles wherein each tile is associated with a burner. With respect to tiles used in connection with burners in a gas turbine, the entire disclosure of a patent application entitled "Gas Turbine Combustion System Having Tiles That Include Premixers", serial number to be determined, is hereby incorporated by reference in its entirety. Referring to FIG. 11, an exemplary integrated tile 96 is shown. The tile 96 includes a plurality of premixers 98 (i.e. a set of premixers) that extend between the front 100 and rear 102 surfaces. Each premixer 98 includes an inlet end 112 and outlet end 114 (one outlet end 114 is shown in a partial cutaway view in FIG. 11 for illustrative purposes) located on the front 100 and rear 102 surfaces, respectively, of the tile 96. The inlet ends 112 receive compressed air 16 moving on a tile air flow path 116.

The tile 96 includes at least one gas fuel inlet 118 which receives gaseous fuel that is delivered to a subset of premixers 98 via fuel galleries. The gas fuel enters a selected premixer 98 in a direction substantially transverse to the direction of the air entering the premixer 98 through the inlet end 112. The premixers 98 have a known configuration and may include known inner and outer swirlers that cause rotation of the air flow received through their respective inlet end 112. Rotation of the incoming air within the premixer 98 due to the swirlers, in conjunction with gas fuel introduced into the premixer 98, premixes the fuel and air prior to combustion so as to provide an appropriate mixture of air and fuel to burner that reduces emissions. The air-fuel mixture then exits the premixer 98 via the outlet end 114, passes through a lattice section 120 and ultimately enters an associated burner for combustion.

Figure 12:
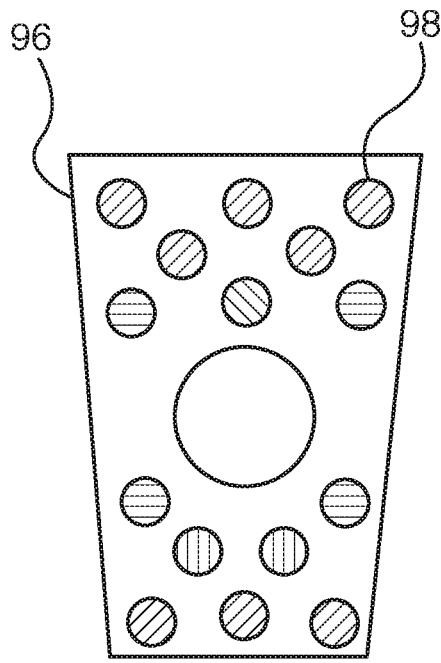
FIG. 12 depicts a premixer and fuel circuit arrangement for a single integrated tile.

In yet another embodiment, the gas turbine includes four fuel circuits (Fuel Circuits 1-4) and p is selected as 24, resulting in 360 total premixers. The gas turbine may include 24 tiles 96 each associated with a burner. Thus, each tile includes 360/24=15 premixers 98 which are staged in accordance with the binary staging scheme 52. Referring to FIG. 12, an exemplary a premixer and fuel circuit arrangement for a single tile 96 having 15 premixers 98 and wherein p=1 is shown. Fuel Circuit 1 is associated with 1 premixer 98, Fuel Circuit 2 is associated with 2 premixers 98, Fuel Circuit 3 is associated with 4 premixers 98 and Fuel Circuit 4 is associated with 8 premixers 98. Fuel Circuits 1-4 each include a single BSV 48 for controlling fuel delivery to associated premixers 98. Thus, opening or closing a BSV 48 activates or deactivates associated premixers 98 in the tile 96 to provide staging of premixers 98 in accordance the binary staging scheme 52.

Figure 13:
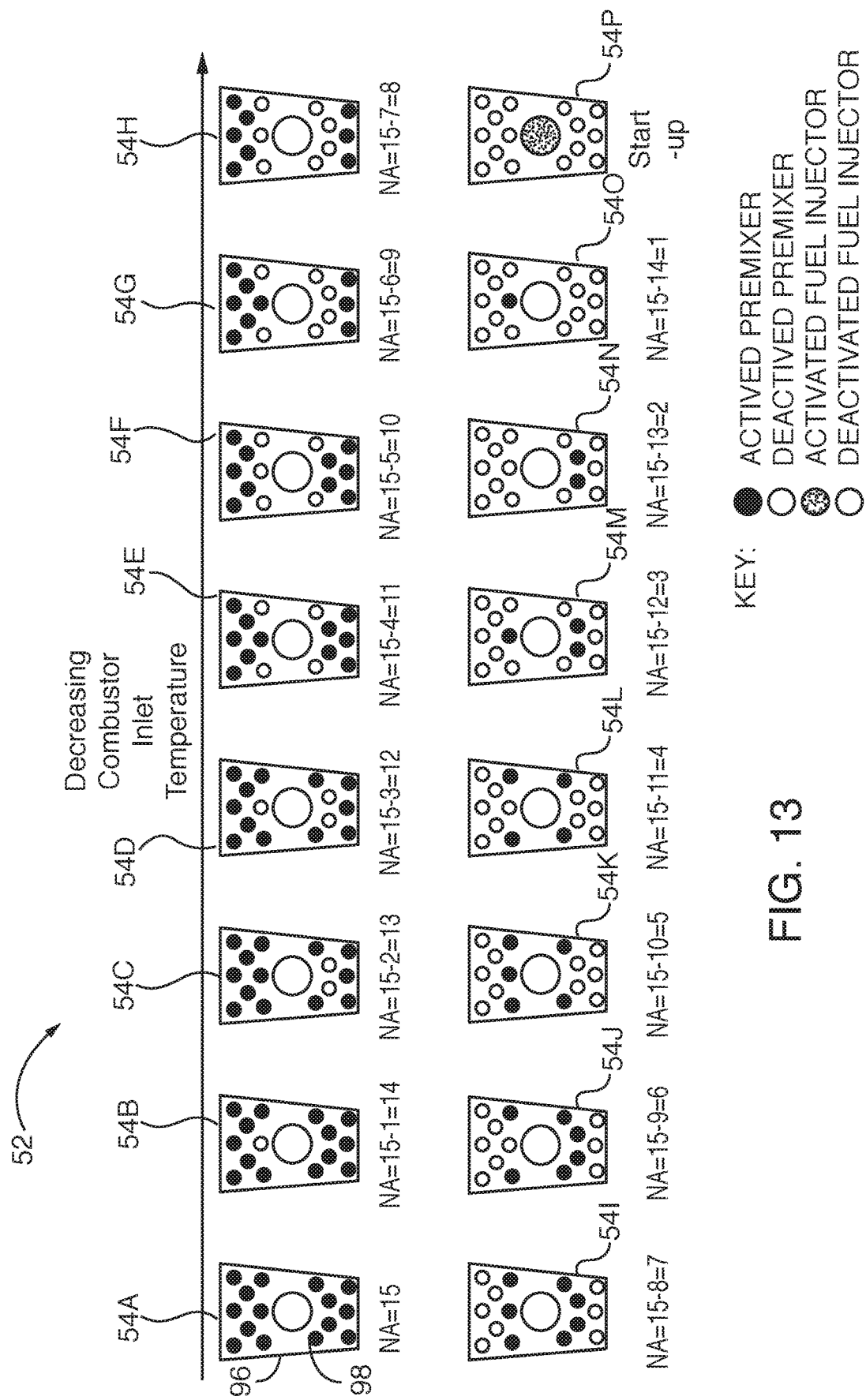
FIG. 13 shows a binary staging scheme for staging the premixers included in the single tile described in relation to FIG. 12.

Referring to FIG. 13, staging steps of a binary staging scheme 52 for staging the premixers 98 included in the single tile 96 described in relation to FIG. 12 are shown. At maximum combustor inlet temperature (step 54A), each of the BSVs 48 associated with Fuel Circuits 1-4 is open thus activating each premixer 96 (i.e. NA=N=15). As combustor inlet temperature decreases, the premixers 98 are deactivated in accordance with the binary staging scheme 52, thus decreasing the number of active premixers 98. In particular, the number of active premixers 98 decreases by the staging step size p (step 54B) and subsequently by increasing consecutive multiples of p (N–p, N–2p, N–3p, N–4p, N–5p, N–6p, N–7p N–13p) at steps 54C, 54D, 54E, 54F, 54G, 54H 54N, respectively). At step 54M, all the premixers are inactive and a fuel injector may be activated for turbine start-up. Due to the binary staging scheme 52, each of the combustors for all the tiles 24 in a combustion section are simultaneously and identically staged.

The binary staging scheme minimizes the number of valves needed to control the premixers or burners. Further, the binary staging scheme minimizes the size of the staging steps, thus minimizing fluctuations in combustor flame temperature. Use of a power of base two pattern is preferred over powers of other bases. For example, use of a base three staging scheme results in relatively large staging steps because of the grouping sizes: p, 3p, 9p, 27p, 81p, etc., therefore resulting in undesirable large fluctuations in combustor flame temperature. The invention addresses disadvantages associated with conventional staging schemes that utilize relatively few valves and thus provide relatively limited control over the flame temperature and result in poor turndown. Alternatively, other conventional staging schemes that utilize many valves may provide precise control over the flame temperature but are relatively expensive and complicated to implement. Specifically, a non-binary staging scheme could result in as many valves as staging steps, whereas the binary staging scheme has fewer valves n than the number of staging steps S, as per Eqn. (3). In addition, the invention enables improvement in the turndown capability of the gas turbine to maintain combustor flame temperatures in a limited range. This is achieved without the use of a bleed system, thus avoiding a thermal efficiency penalty for the gas turbine.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A method for staging premixers in a combustion system for a gas turbine having a compressor section and a turbine section, comprising:

providing a plurality of burners each including premixers;

providing compressed air from the compressor section to the premixers;

providing a plurality of fuel circuits that deliver fuel to the premixers to provide premixed air and fuel used for combustion in the combustion system;

associating premixers with each fuel circuit in accordance with a power of base two pattern; and activating or deactivating the premixers in stages by activating or deactivating an associated fuel circuit to deliver fuel or stop fuel delivery, respectively, to the premixers, wherein a staging step size between consecutive stages is in accordance with a power of base two staging scheme, wherein the number of premixers associated with a given fuel circuit n is given by:

$$\text{number of premixers associated with the given fuel circuit} = (2^{n-1})p,$$

where n=fuel circuit number, where p=staging step size, wherein the total number of premixers for a given number of fuel circuits is given by:

$$\text{total number of premixers} = N = p\Sigma_{i=1}^{n} 2^{i-1},$$

wherein the total number of possible staging steps is given by:

$$\text{total number of possible staging steps} = S = N/p - 1.$$

2. The method according to claim 1, wherein the number of active premixers or burners decreases by increasing consecutive multiples of the staging step size as combustor inlet temperature decreases wherein associated fuel circuits are re-combined in accordance with the power of base two pattern.

3. The method according to claim 2, wherein the staging step size follows a pattern including N−p, N−2p, N−3p, N−4p, N−5p, N−6p, N−7p, wherein the pattern continues until the number of active premixers or burners is equivalent to the staging step size p as combustor inlet temperature is decreased.

4. The method according to claim 1, wherein the number of active premixers or burners increases by decreasing consecutive multiples of the staging step size as combustor inlet temperature increases wherein associated fuel circuits are re-combined in accordance with the power of base two pattern.

5. The method according to claim 1, wherein the staging scheme maintains a burner flame temperature within a range suitable for reducing gas turbine emissions.

6. The method according to claim 1, wherein activation or deactivation of a fuel circuit is controlled by a fuel valve.

7. A method for staging premixers in a combustion system for a gas turbine having a compressor section and a turbine section, comprising:
providing a plurality of burners each including premixers;
providing compressed air from the compressor section to the premixers;
providing a plurality of fuel circuits that deliver fuel to the premixers to provide premixed air and fuel used for combustion in the combustion system;
associating premixers with each fuel circuit in accordance with a power of base two pattern, wherein at least one burner includes first premixers that are associated with a first fuel circuit; and
activating or deactivating the premixers in stages by activating or deactivating an associated fuel circuit to deliver fuel or stop fuel delivery, respectively, to the premixers wherein a staging step size between consecutive stages is in accordance with a power of base two staging scheme and wherein activation or deactivation of the first fuel circuit activates or deactivates the first premixers and turns the burner on or off, respectively,
wherein the number of premixers associated with a given fuel circuit n is given by:

number of premixers associated with the given fuel circuit=$(2^{n-1})p$, where n=fuel circuit number,
where p=staging step size,
wherein the total number of premixers for a given number of fuel circuits is given by:

total number of premixers=$N=p\Sigma_{i=1}^{n}2^{i-1}$, wherein the total number of possible staging steps is given by:

total number of possible staging steps=$S=N/p-1$.

8. The method according to claim 7, wherein the number of active premixers decreases by increasing consecutive multiples of the staging step size as combustor inlet temperature decreases wherein associated fuel circuits are re-combined in accordance with the power of base two pattern.

9. The method according to claim 8, wherein the staging step size follows a pattern including N−p N−2p, N−3p, N−4p, N−5p, N−6p, N−7p, wherein the pattern continues until the number of active premixers or burners is equivalent to the staging step size p as combustor inlet temperature is decreased.

10. The method according to claim 7, wherein the staging scheme maintains a burner flame temperature within a range suitable for reducing gas turbine emissions.

11. The method according to claim 7, wherein activation or deactivation of a fuel circuit is controlled by a fuel valve.

12. A method for staging premixers in a combustion system for a gas turbine having a compressor section and a turbine section, comprising:
providing a plurality of burners for combustion;
providing a tile associated with each burner, wherein each tile includes a plurality of premixers;
providing compressed air from the compressor section to the premixers;
providing a plurality of fuel circuits that deliver fuel to the premixers to provide premixed air and fuel used for combustion in the combustion system;
associating premixers with each fuel circuit in accordance with a power of base two pattern; and
activating or deactivating the premixers in stages by activating or deactivating an associated fuel circuit to deliver fuel or stop fuel delivery, respectively, to the premixers wherein a staging step size between consecutive stages is in accordance with a power of base two staging scheme,
wherein the number of premixers associated with a given fuel circuit n is given by:

number of premixers associated with the given fuel circuit=$(2^{n-1})p$, where n=fuel circuit number,
where p=staging step size,
wherein the total number of premixers for a given number of fuel circuits is given by:

total number of premixers=$N=p\Sigma_{i=1}^{n}2^{i-1}$, wherein the total number of possible staging steps is given by:

total number of possible staging steps=$S=N/p-1$.

* * * * *